(12) United States Patent
Saita et al.

(10) Patent No.: US 7,112,367 B2
(45) Date of Patent: Sep. 26, 2006

(54) TAPE FOR TYING ELECTRIC WIRE

(75) Inventors: Seiji Saita, Kanagawa (JP); Kazuo Suzuki, Kanagawa (JP); Shigeo Kawasaki, Kanagawa (JP); Takeshi Saito, Kanagawa (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 254 days.

(21) Appl. No.: 10/344,160

(22) PCT Filed: Oct. 31, 2002

(86) PCT No.: PCT/JP02/11357

§ 371 (c)(1),
(2), (4) Date: Feb. 10, 2003

(87) PCT Pub. No.: WO2004/039873

PCT Pub. Date: May 13, 2004

(65) Prior Publication Data

US 2004/0086707 A1 May 6, 2004

(51) Int. Cl.
*B32B 7/10* (2006.01)

(52) U.S. Cl. .................................. 428/356; 428/355 R

(58) Field of Classification Search .............. 428/355 R, 428/356, 355 AC, 355 N; 524/584, 586
See application file for complete search history.

(56) References Cited

U.S. PATENT DOCUMENTS 6,265,782 B1 * 7/2001 Yamamoto et al. ......... 257/783

FOREIGN PATENT DOCUMENTS

| JP | 7-18226 | | 1/1995 |
| JP | 2001-14962 | | 1/2001 |
| JP | 2001-348547 | | 12/2001 |
| JP | 2002212356 A | * | 7/2002 |
| JP | 2002-212356 | | 7/2002 |
| JP | 2002-265902 | * | 9/2002 |
| WO | WO 95/34597 | | 12/1995 |

OTHER PUBLICATIONS

International Search Report (Dated Dec. 24, 2002).

* cited by examiner

*Primary Examiner*—Thao Tran
(74) *Attorney, Agent, or Firm*—Nixon Peabody LLP

(57) ABSTRACT

In consideration of that burning a PVC-based tape causes occurrence of dioxine, a nonhalogenated tape having physical properties and electric properties, which are comparable to a PVC-based tacking tape, and replaceable to the PVC-based tacking tape is desired. Simple replacement of PVC to a polyethylene-based synthetic resin causes a bad hand cutting performance. Hence, the composition of the synthetic resin composition is improved to have 100 weight parts of a polypropylene-based resin, 1 to 70 weight parts of a polyethylene-based resin, 1 to 200 weight parts of an inorganic filler with a range from 0.5 µm to 10 µm of an average grain size, and 0.1 to 50 weight parts of an compatibilizer to form a film. In addition, the film is drawn 1.05 to 3 times in an MD and thickness of the film is kept to 0.03 to 0.5 mm.

4 Claims, 1 Drawing Sheet

Fig. 1

| | | | Example | | | | | Comparative example | | | | | | | | | | | | |
|---|---|---|---|---|---|---|---|---|---|---|---|---|---|---|---|---|---|---|---|---|
| | | | 1 | 2 | 3 | 4 | 5 | 1 | 2 | 3 | 4 | 5 | 6 | 7 | 8 | 9 | 10 | 11 | 12 |
| synthetic resin composition | PP | polypropylene random polymer | 100 | 50 | 100 | 100 | 100 | 100 | 100 | 100 | 100 | 100 | 100 | 100 | 100 | 100 | 100 | 100 | 100 |
| | PE | very low density polyethylene | | 50 | | | | | | | | | | | | | | | |
| | inorganic filler | magnesium hydroxide 0.3 μm | 30 | 20 | 30 | 30 | | 0.5 | 100 | 30 | 30 | 30 | 30 | 30 | 30 | 30 | 30 | 30 | 30 |
| | | 3.0 μm | | | | | 30 | | | | | | | | | | | | |
| | | 15.0 μm | 70 | 70 | 70 | 70 | 70 | 70 | | | | 70 | | | | | | | 70 |
| | compatibilizer | ethylene – ethyl acrylate copolymer | 5 | 5 | 5 | 5 | 5 | 5 | 5 | 5 | 5 | 5 | 5 | 0.05 | 70 | 5 | 5 | 5 | 5 |
| | cross-linker | trimethylol propane triacrylate | | | 5 | 5 | | | | 0.5 | 250 | | | | | | | | |
| | drawing ratio | | | | 100 | | | | 1.15 | | | | | | | 1.01 | | 1.15 | |
| | electron ray exposure (Mrad) | | | | | 5 | 5 | | | | | | | | | | 5 | 300 | |
| Composition | tackiness agent | rubber-based | | | | 5 | 5 | | | | | | | | | | | | |
| | flame retardant | ammonium polyphosphate | | | | | | | | | | 100 | | | | | | | 60 |
| Characteristic value | | Removal from the electric wire | O | O | O | O | O | O | O | O | O | O | O | O | O | O | O | O | × |
| | | pinhole-proof performance | O | O | O | O | O | × | O | × | × | × | × | × | O | O | O | O | O |
| | | hand cutting performance | O | O | O | O | O | O | × | × | × | × | × | O | × | × | × | × | O |
| | | heat resistant performance Deg. C × 10,000 h | 105 | 101 | 120 | 120 | 105 | 105 | 105 | 105 | 105 | 105 | 105 | 105 | 105 | 100 | 108 | 120 | 105 |
| | | flame retardancy OI value | 18 | 18 | 18 | 24 | 24 | 18 | 18 | 18 | 18 | 18 | 18 | 18 | 18 | 18 | 18 | 18 | 24.5 |
| | | General evaluation | O | O | O | O | O | × | × | × | × | × | × | × | × | × | × | × | × |

TAPE FOR TYING ELECTRIC WIRE

TECHNICAL FIELD

The present invention relates to a polyolefin-based (PO) tape to be wound as an electric insulator around an electric wire cable used for an electric apparatus and an automobile. Particularly the present invention relates a nonhalogen-based electric wire-tying tape, which is excellent in a pinhole proof performance, a hand cutting performance, flame retardancy, and heat resistant performance.

BACKGROUND OF THE INVENTION

As a conventional electric wire-tying tape (hereafter tape,) that prepared by using a polyvinyl chloride (PVC)-based resin composition is wide used. This is selected by consideration of physical properties (elasticity, hand cutting performance, and flame retardancy) and electric properties (insulating performance, electric strength, and breakdown voltage) required for electric wire tying.

However, an amount of chlorine contained in the tape prepared by using the PVC-based resin composition ranges from 30 to 45% by weight and hence, combusting this produces dioxine in accordance with a condition of combustion to cause a bad effect on an outside and generates hydrochloride to cause acid rain, of which both are of environmental problems.

Replacing simply the above described PVC-based resin composition to a polypropylene-based synthetic resin results in "the hand cutting performance to inhibit a practical application. This term, the hand cutting performance, is a characteristic, in which when the tape is wound back from a cardboard core, cutting the tape making a slit in a width direction of the tape by hands provides a cut without elongation of a cut end. This characteristic is an important for practical application of the tape.

Thus, an object of the present invention is to provide the nonhalogen-based tape having flame retardancy heat resistant performance also having good the hand cutting performance, the above described physical properties, and the above described electric characteristics of the PVC-based tape.

DISCLOSURE OF INVENTION

The inventors of the present invention conducted an intensive studied. As a result, in the tape having a based material, which is prepared by forming a synthetic resin composition in a band shape, they found that a technical subject of improving the hand cutting performance can be solved by compounding 100 weight parts of a polypropylene-based resin, 1 to 70 weight parts of a polyethylene-based resin, 1 to 200 weight parts of an inorganic filler with a range from 0.5 µm to 10 µm of an average grain size, and 0.1 to 50 weight parts of an compatibilizer in the above described synthetic resin composition and increasing elongation 1.05 to 3 times in an MD (machine direction.)

We found that the concerning "flame retardancy" can be improved by containing simply the inorganic filler, but also 0.5 parts to 50 parts of the inorganic filler against 100 part of an tackiness agent in the tape based material. In addition, we found that "heat resistant performance" can be improved by adding a cross linking agent to the film and applied electron ray exposure treatment.

The polypropylene-based resin was adopted as the synthetic resin composition of the tape for tying electric wire, according to the present invention, in consideration of physical properties (elasticity, the hand cutting performance, and flame retardancy) and electric properties (insulating performance, electric strength, and breakdown voltage,) and nonhalogenation necessary the tape for tying electric wire.

The above described polypropylene-based resin is exemplified by a polypropylene homopolymer generally exemplified, moreover, a highly crystalline homopolymer, a polypropylene random polymer being propylene-ethylene copolymer, a polypropylene block polymer, a polypropylene block polymer prepared by polypropylene and $CH_2=CHR$ (R: an aliphatic and aromatic groups with carbon numbers ranging from 2 to 8,) and TPO. The TPO is a polypropylene polymer prepared by making polypropylene as a hard segment, ethylene-propylene butadiene rubber (EPR,) ethylene-propylene diene rubber (EPDM,) acrylonitrile butadiene rubber (NBR,) and natural rubber (NR) as a soft segment and polymerizing by meting kneading using a reactor. By the way, the above described polypropylene-based resin may be used independently and may be used as a combination of a plurality of species.

The reason of compounding the polyethylene-based resin in the synthetic resin composition is because forming the tape by using independently the polypropylene-based resin causes a pinhole in the tape itself resulting in decrease in insulating performance and electric strength.

On the other hand, single use of the polyethylene-based resin shows a melting point ranging from 130 to 170 deg. C. to require setting a processing temperature (180 to 220 deg. C.) in a high and narrow temperature range at processing the tape. However, compounding the polyethylene-based resin can make lower and extend a range of the processing temperature possible to allow easy processing. This is because the softening point of the polyethylene-based resin is lower than the polypropylene-based resin.

Where, very small amount of the polyethylene-based resin compounded inhibits an effect of compounding the polyethylene-based resin to occur easily the pinhole on the tape itself resulting in decrease in insulating performance and electric strength. On the other hand, very large amount causes very much improvement of elasticity of the tape resulting in inhibition of the hand cutting performance. Therefore, according to an analysis by the inventors of the present application, the amount of the polyproplen-based resin compounded is preferably ranges from 1 to 70 weight parts against 100 weight parts of the polyproplen-based resin and 20 to 50 weight parts are particularly preferable.

The polyethylene-based resin can be adopted by proper selection from conventionally publicly known resins and exemplified by the following ethylene-based (co)polymer: a high density polyethylene, a medium density polyethylene, a very low density polyethylene, a high pressure processed polyethylene, a linear low density polyethylene, thylene-vinyl ester copolymer such as a ethylene-vinyl acetate copolymer, ethylene-ethyl-acrylate copolymer, a copolymer with ethylene-α, β carboxylic acid or its derivative such as ethylene-(meta) acrylate alkyl ester copolymer. These may be used independently or in combination of a plurality of species.

Next, the reason of compounding the inorganic filler in the synthetic resin composition according to the present invention is because of improving the hand cutting performance and in addition, increasing a heat conductivity at forming processing to increase a cooling effect on the synthetic resin composition resulting in making distortion occurred in the synthetic resin composition small.

A very small average grain size of this inorganic filler causes bad hand cutting performance and on the contrary, very large size causes decrease in a tensile strength and breaking extension and also makes the pinhole easy to occur. Therefore, the inventors of present application analyzed and as the result, the average grain size of this inorganic filler ranges preferably from 0.5 μm to 10 μm and particularly preferably from 1.0 to 5.0 μm.

The very small amount of the inorganic filler compounded causes bad hand cutting performance and very large amount decrease in the tensile strength and breaking extension and also makes the pinhole easy to occur. Therefore, the range from 1 to 200 weight parts is preferable and the range from 50 to 150 weight parts is particularly preferable.

The inorganic filler is exemplified by aluminium hydroxide, magnesium hydroxide, zirconium hydroxide, calcium hydroxide, potassium hydroxide, barium hydroxide, triphenyl phosphite, ammonium polyphosphate, amide polyphosphate, zirconium oxide, magnesium oxide, zinc oxide, titanium oxide, molybdenum oxide, guanidine phosphate, hydrotalcite, smectite, zinc borate, zinc borate anhydride, zinc metaborate, barium metaborate, antimony oxide, antimony trioxide, antimony pentaoxide, red phosphorus, talc, alumina, silica, boehmite, bentonite, sodium silicate, calcium silicate, calcium sulfate, calcium carbonate, magnesium carbonate, and the like. These may be used independently or in combination of a plurality of species.

Subsequently, the reason of compounding the compatibilizer in the synthetic resin composition in the present invention is because it was found that the above described polypropylene resin, the above described polyethylene resin, and the above described inorganic filler simply compounded causes uneven dispersion and the pinhole easily on the tape and in other words, because of a purpose of even dispersion of these components.

Very small amount of the compatibilizer compounded makes the tape easy to cause the pinhole. On the other hand, very large amount causes excessive decrease in meting viscosity resulting in inhibition of the hand cutting performance. Therefore, a preferable range is from 0.1 to 50 weight parts and 3 to 20 weight parts are particularly preferable.

The compatibilizer is exemplified by ethylene-glycidyl (meta) acrylate copolymer, ethylene-ethyl acrylate copolymer, ethylene-vinyl acetate copolymer, ethylene-ethyl acrylate-maleic acid anhydride copolymer, hydrogenated styrene butadiene rubber (HSBR,) styrene-ethylenebutylene-olefin crystal-block copolymer (SEBC,) olefin crystal-ethylenebutylene-olefin crystal-block copolymer CEBC,) polyethylene-maleic acid anhydride denatured copolymer (PE-M,) polypropylene-maleic acid anhydride copolymer (PP-M,) and the like. These may be used independently or in combination of a plurality of species.

Next, in the tape according to the present invention, drawing processing in an MD direction was adopted and a thickness of the base material was set to a range from 0.03 to 0.5 mm to realize both the hand cutting performance and elasticity.

According to our intensive study, the drawing ratio in the MD direction ranges preferably from 1.05 to 3 times. The drawing ratio lower than 1.05 times causes too much elongation of the base material in tying the electric wire resulting in bad hand cutting performance and decrease in workability. On the other hand, drawing ratio over three times causes hardening of the base material resulting in impossibility of hand cutting.

Moreover, the reason of setting the thickness of the base material to the range from 0.03 to 0.5 mm is because for a work of winding the electric wire with various shapes, elasticity is required and elasticity is determined generally according to the thickness of the tape.

Exposing the tape according to the present invention to electron rays to cross-link the above described synthetic resin composition allows making temperature dependency (contraction and expansion properties in accordance with ambient temperature change) of the tape small.

An amount of exposure of electron rays is preferably 250 Mrad (megarad) or smaller. Exposure larger than 250 Mrad causes shrinkage of the base material. On the other hand, a cross-linker may be add d to enhance cross-linking by electron rays.

Specific cross-linker is exemplified by a low molecular weight compound and an oligomer, which have at least 2 or more carbon-carbon double bonds in a molecule. For example, there are an acrylate-based compound, a urethane acrylate-based oligomer, and an epoxy acrylate-based oligomer.

The above described acrylate-based compound is exemplified by trimethylol propane triacrylate, tetramethylol methane tetraacrylate, pentaerythritol triacrylate, pentaerythritol tetraacrylate, dipentaerythritol monohydroxy pentaacrylate, dipentaerythritol hexaacrylate, or 1,4-butylenes glycol diacrylate, 1,6-hexane diol diacrylate, polyethylene glycol diacrylate, oligoester acrylate, and the like.

Urethane acrylate-based oligomer is a thermosetting compound has at least 2 or more carbon-carbon double bonds and exemplified by those yielded by reacting a terminal isocyanate urethane prepolymer, which is obtained by reaction of a polyester type or polyether type polyol with a polyvalent isocyanate compound such as 2,4-trilene diisocyanate, 2,6-trilene diisocyanate, 1,3-xylilene diisocyanate, 1,4-xylilene diisocyanate, diphenyl methane 4,4-diisocyanate, and the like, with an acrylate or methacrylate, which has a hydroxyl group, such as 2-hydroxyethyl acrylate, 2 hydroxyethyl methacrylate, 2-hydroxypropyl acrylate, 2-hydroxypropyl methacrylate, polyethylene glycol acrylate, polyethylene glycol methacrylate, and the like.

For the tape, according to the present invention, having the above described base material-compounding composition, an tackiness agent layer may formed on one side or both sides of the tape. As the tackiness agent to form this tackiness agent layer, the tackiness agent commonly used can be appropriately used and, for example, a rubber-based tackiness agent, an acryl-based tackiness agent, and the like can be used.

To this tackiness agent layer, may be added the inorganic filler working as a flame retardant, when necessary. The amount of the inorganic filler added to the tackiness agent layer is preferably 50 weight parts or smaller. The amount larger than 50 weight parts causes decrease in tacking property resulting in no attachment to the electric wire.

In the synthetic resin compound used for the tape according to the present invention, can be compounded an additive such as a colorant, an antioxidant, an ultraviolet ray absorbing agent, a lubricant, stabilizer, and others in the range not inhibit the effect of the present invention when necessary.

BRIEF DESCRIPTION OF THE DRAWINGS

FIG. 1 is a view (table) showing a compound and characteristic values of the synthetic resin composition used in individual examples and comparative examples.

THE BEST MODE FOR CARRYING OUT THE (CLAIMED) INVENTION

Examples according to the present invention will be described below with reference to FIG. 1 (table) in comparison with comparative examples.

In FIG. 1 (table,) "PP" and "PE" represent polypropylene-based resin and polyethylene-based resin, respectively. "TPO" is the polypropylene polymer prepared by making polypropylene as the hard segment, ethylene-propylene butadiene rubber (EPR,) ethylene-propylene diene rubber (EPDM,) acrylonitrile butadiene rubber (NBR,) and natural rubber (NR) as the soft segment and polymerizing by meting kneading using the reactor. A unit of the value shown in a section of the synthetic resin composition in FIG. 1 (table) is the weight part.

Method for Evaluation Characteristic Values

"Removal from the electric wire," which is a characteristic value in FIG. 1 (table,) was evaluated by winding the tape around the electric wire in a half lap form and keeping at 23 deg. C and 50 deg. C for 1 month to observe removal of the tape.

For the upinhole proof performance," the tape formed in a width of 25 mm and a length of 100 m was drawn up to the length of 200 mm in a tensile rate of 300 mm/min and presence of the pinhole occurred on a surface of the tape was observed in unaided eyes. The without the pinhole is determined as good (O) and that, in which 1 or more pinhole occurred, was determined as defective (X.)

About the "hand cutting performance," the tape formed in a width of 25 mm and a length of 100 m was cut transversely by hands and a state of a cut face was evaluated. A case, where the cut face was smooth, is determined as good (O) and the case, where the tape was elongated and broken on the cut face, was determined as defective (X.)

"Heat resistant performance" shows a temperature effective for 10000 hours. 10000 hours effectiveness is that presents no break, no crack, and no melting of the tape caused by winding the tape around the electric wire in the half lap form.

"Flame retardancy" was tested following a combustion test designated by JIS K7210 Oxygen index method. An OI value, as high as possible, presented in FIG. 1 (table) expresses excellent flame retardancy.

In "generalized evaluation" in FIG. 1 (table,) a category having all characteristic values evaluated as good was defined as proper (O) and that having any one characteristic value showing defective evaluation was defined as improper (X.)

EXAMPLE 1

The of example 1 is that the synthetic resin composition according-to the present invention consists of 100 weight parts of TPO as the polypropylene-based resin, 30 weight parts of the very low density polyethylene resin as the polyethylene-based resin, 70 weight parts of magnesium hydroxide as the inorganic filler having the average grain size of 3.0 μm, and 5 weight parts of ethylene-ethyl acrylate copolymer as compatibilizer (refer to FIG. 1 (table)) and contains a small amount of the stabilizer, lubricant, and colorant.

After kneading by using a Banbury mixer, the above described composition was drawn 1.15 times by calendaring to form it in the thickness of about 0.1 mm.

For the tackiness agent layer, was used a rubber-based tackiness agent.

By the way, other examples and comparative examples were carried out under conditions similar to those of this example except a part specially mentioned.

EXAMPLE 2

For the tape according to example 2, the 100 weight parts of TPO of example 1 was replaced to the 100 weight parts as a total of 50 weight parts of TPO and 50 weight parts of the polypropylene random polymer. This example is prepared to prove that the objective tape is yielded by using a plurality of the polypropylene-based resin.

EXAMPLE 3

5 weight parts of trimethylol propane triacrylate as the cross-linker was added and electron ray exposure was conducted at the condition of 100 Mrad.

EXAMPLE 4

Similar to example 3, 5 weight parts of trimethylol propane triacrylate as the cross-linker was added and electron ray exposure was conducted at the condition of 100 Mrad. To the tackiness agent layer, was added 5 weight parts of ammonium polyphosphate as the flame retardant to 100 weight parts of the rubber-based tackiness agent.

EXAMPLE 5

No cross-linker was added to the synthetic resin component of the base material (electron ray exposure was not carried out) and 5 weight parts of ammonium polyphosphate as the flame retardant to the tackiness agent layer.

COMPARATIVE EXAMPLE 1

For a compounded amount of the low density polyethylene of example 1, 30 weight parts was changed to 0.5 weight parts. This comparative example 1 is the comparative example compounded with a small amount of the polyethylene-based resin.

COMPARATIVE EXAMPLE 2

The compounded amount of the low density polyethylene of example 1 was changed to 100 weight parts. This comparative example 2 is the comparative example, in which the compounded amount of the polyethylene-based resin was increased.

COMPARATIVE EXAMPLE 3

The compounded amount of magnesium hydroxide as the inorganic filler of example 1 was changed to 0.5 weight parts. This comparative example 3 is the comparative example, in which the compounded amount of the inorganic filler was decreased.

COMPARATIVE EXAMPLE 4

The compounded amount of magnesium hydroxide as the inorganic filler of example 1 was changed to 250 weight parts. This comparative example 4 is the comparative example, in which the compounded amount of the inorganic filler was increased.

COMPARATIVE EXAMPLE 5

The average grain size of magnesium hydroxide as the inorganic filler of example 1 was changed from 3.0 μm to 0.3 μm. This comparative example 5 is the comparative example, in which the average grain size of the inorganic filler was decreased.

COMPARATIVE EXAMPLE 6

The average grain size of magnesium hydroxide as the inorganic filler of example 1 was changed from 3.0 μm to 15

μm. This comparative example 6 is the comparative example, in which the average grain size of the inorganic filler was increased.

COMPARATIVE EXAMPLE 7

The compounded amount of compatibilizer of example 1 was changed to 5 weight parts to 0.05 weight parts. (訳注 μm 比較り) This comparative example 7 is the comparative example, in which the compounded amount of the compatibilizer was decreased.

COMPARATIVE EXAMPLE 8

The compounded amount of compatibilizer of example 1 was changed to 5 weight parts to 70 weight parts. This comparative example 8 is the comparative example, in which the compounded amount of the compatibilizer was increased.

COMPARATIVE EXAMPLE 9

The drawing ratio 1.15 times of example 1 was changed to 1.01 times to form the product. This comparative example 9 is the comparative example, in which the drawing ratio was decreased.

COMPARATIVE EXAMPLE 10

The drawing ratio 1.15 times of example 1 was changed to 5 times to form the product. This comparative example 10 is the comparative example, in which the drawing ratio was increased.

COMPARATIVE EXAMPLE 11

5 weight parts of trimethylol propane triacrylate as the cross-linker was added and electron ray exposure was conducted at the condition of 300 Mrad. This comparative example 11 is the comparative example, in which the electron ray exposure was strengthened.

COMPARATIVE EXAMPLE 12

This is the comparative example, in which to the tackiness agent layer of example 1, was added 60 weight parts of ammonium polyphosphate as the flame retardant to 100 weight parts of the rubber-based tackiness agent. This comparative example 12 is the comparative example, in which the compounded amount of the flame retardant of the tackiness agent layer was increased in comparison with that of example 5.

Result of Evaluation of Characteristic Values

Comparative example 1 yielded no pinhole proof performance. The comparative example 2, in which the compounded amount of the low density polyethylene resin of example 1 was changed to 100 weight parts, showed a bad hand cutting performance.

Comparative example 3, in which the compounded amount of the magnesium hydroxide of example 1 was changed to 0.5 weight parts, showed the bad hand cutting performance. Comparative example 4, in which the compounded amount of the magnesium hydroxide of example 1 was changed to 250 weight parts, yielded no pinhole proof performance.

The comparative example 5, in which The average grain size of magnesium hydroxide of example 1 was changed to 0.3 μm, showed the bad hand cutting performance.

Comparative example 6, in which the average grain size of magnesium hydroxide of example 1 was changed to 15.0 μm, yielded no pinhole proof performance.

Comparative example 7, in which the compounded amount of the ethylene ethyl acrylate copolymer of example 1 was changed to 0.05 weight parts, yielded no pinhole proof performance.

Comparative example 8, in which the compounded amount of the ethylene ethyl acrylate copolymer of example 1 was changed to 70 weight parts, yielded the bad hand cutting performance.

Comparative example 9, in which the drawing ratio in the MD direction of example 1 was set to 1.01 times, showed too much elongation of the base material to make the hand cutting performance bad.

Comparative example 10, in which the drawing ratio in the MD direction of example 1 was changed to 5 times, hardening of the base material to make the hand cutting performance bad.

Comparative example 11, in which the cross-linker was added to the synthetic resin composition of example 1 and electron ray exposure was conducted at the condition of 300 Mrad, causes shrinkage of the base material to make the hand cutting performance bad.

The comparative example 12, in which 60 weight parts of the flame retardant was compounded to the tackiness agent layer of example 1, showed bad removal from the electric wire.

As described above, the generalized evaluation of examples of 1 to 5 was all appropriate (O) and on the contrary, the generalized evaluation of comparative examples of 1 to 12 was all inappropriate (X.) From this result, it was make evident that the present invention can provide the nonhalogen-based tape having the above described physical properties, and the above described electric characteristics of the PVC-based tape, showing good hand cutting performance, and having retardancy and heat resistant performance.

Though not shown in FIG. 1 (table,) thermal deformation ratio of the tape of example 1 was −30% at 16 deg. C. This thermal deformation ratio is the thermal deformation ratio of the length in the length direction of the tape left stand at 23 deg. C. from 30 min and the tape before processing after heat processing was performed at 160 deg. C. from 5 min. The ratio expresses temperature dependency of the tape. As other example, when the film base material of this example 1 was exposed to 70 Mrad electron rays, the thermal deformation ratio thereof became −5% and temperature dependency deceased.

On the other hand, though not shown in FIG. 1 (table,) examples 1 and 2 showed the tensile strength, breaking extension, electric insulation (volume specific resistance of $1 \times 10^{12}$ Ω.cm or higher,) electric strength, and breakdown voltage, which were comparable to a conventional PVC-based tacking tape.

INDUSTRIAL APPLICABILITY

A tape having a base material prepared by forming a synthetic resin composition in a band shape. A tape according to the present invention is obtained from the synthetic resin composition prepared by dispersing evenly through kneading compounds of 100 weight parts of a polypropylene-based resin, 1 to 70 weight parts of a polyethylene-based resin, 1 to 200 weight parts of an inorganic filler with a range from 0.5 μm to 10 m m of an average grain size, and 0.1 to 50 weight parts of an compatibilizer to form a film, followed by drawing the film 1.05 to 3 times in an MD and keeping a thickness of the film to 0.03 to 0.5 mm. The tape prepared in this way holds physical properties (tensile strength, breaking extension, and flame retardancy)

and electric properties (insulating performance, electric strength, and breakdown voltage,) is nonhalogenated, and also occurs a pinhole when the tape is drawn, and provides good hand cutting performance. Thus, the tape can be used for tying an electric wire.

What is claimed is:

1. A tape, which is used for tying an electric wire having a base material prepared by forming a synthetic resin composition in a band shape, wherein the synthetic resin composition is dispersed evenly by kneading compounds of 100 weight parts of a polypropylene-based resin, 1 to 70 weight parts of a polyethylene-based resin, 1 to 200 weight parts of an inorganic filler with a range from 0.5 μm to 10 μm of an average grain size, and 0.1 to 50 weight parts of an compatibilizer to form a film, followed by drawing the film 1.05 to 3 times in an MD and keeping a thickness of the film to 0.03 to 0.5 mm to form a tape shape.

2. The tape, which is used for tying an electric wire, according to claim 1, wherein the synthetic resin composition is added with a cross-linker and subjected to a cross-linking processing by exposure to electron rays.

3. The tape, which is used for tying an electric wire, according to claim 2, wherein the cross-linking processing is operated at 250 or lower Mrad.

4. The tape, which is used for tying an electric wire, according to claim 1, wherein a tackiness agent layer is formed containing 50 or smaller weight parts of an inorganic filler.

* * * * *